G. KOMLOSY.
DIRECTION INDICATOR.
APPLICATION FILED MAY 5, 1920.
1,380,152.
Patented May 31, 1921.
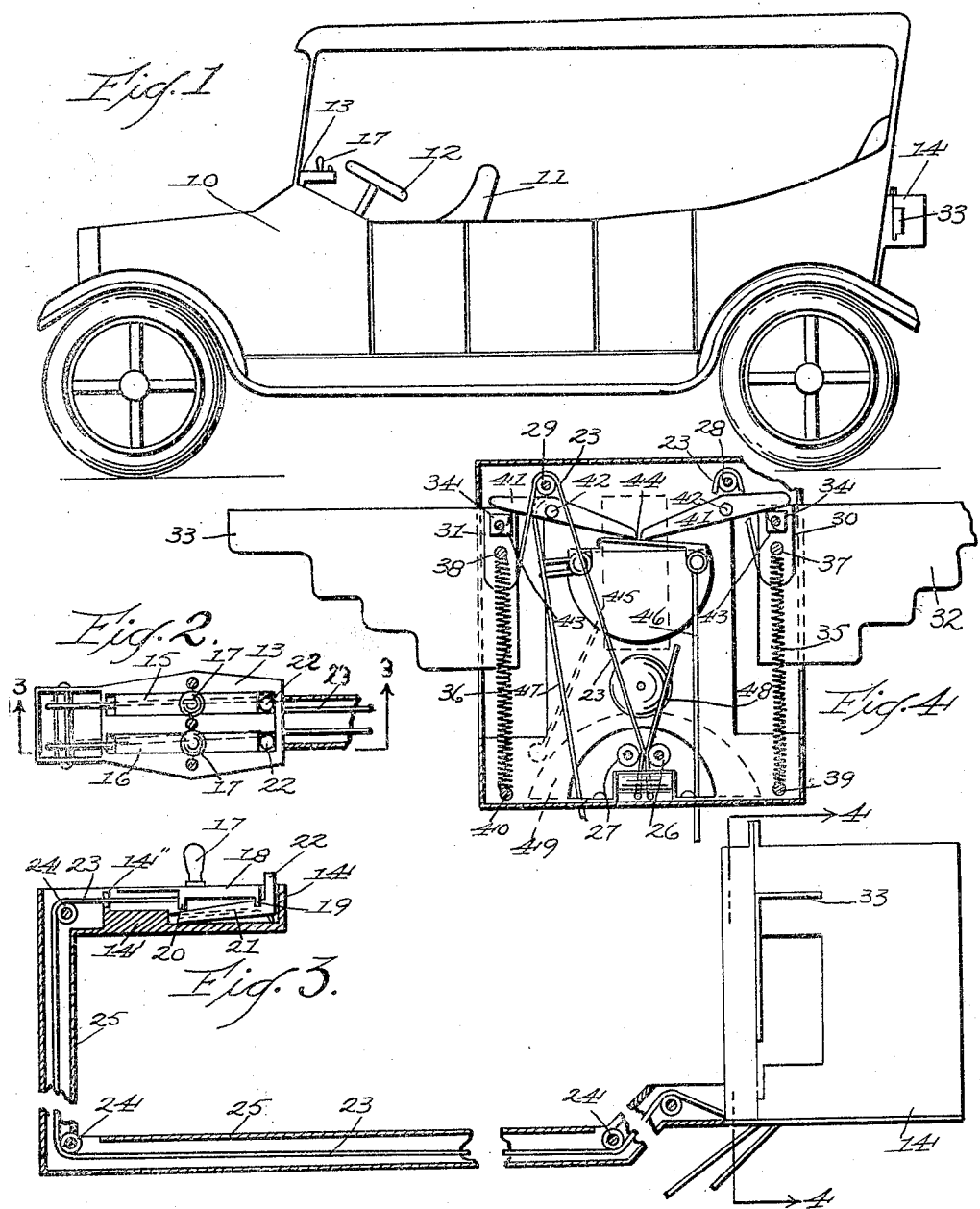
INVENTOR
George Komlosy
BY
George C. Heinicke,
ATTORNEY ial No. 379,094.
UNITED STATES PATENT OFFICE.

GEORGE KOMLOSY, OF YONKERS, NEW YORK.

DIRECTION-INDICATOR.

1,380,152.  Specification of Letters Patent.  Patented May 31, 1921.

Application filed May 5, 1920. Serial No. 379,094.

*To all whom it may concern:*

Be it known that I, GEORGE KOMLOSY, a citizen of the United States, residing at Yonkers, county of Westchester, and State of New York, have invented certain new and useful Improvements in Direction-Indicators, of which the following is a specification.

This invention relates to improvements in signal apparatus for vehicles and has particular application to a direction indicator for motor vehicles.

In carrying the present invention into practice it is my purpose to provide a direction indicator for vehicles whereby the driver of the vehicle may notify pedestrians and the drivers of other vehicles behind his vehicle of the manner in which he is about to control his vehicle, thereby eliminating confusion of the traffic at curbs and crossing points and the like and avoiding accidents, collisions and the like, and enabling the vehicles to be operated with comparative safety.

It is furthermore my purpose to provide a direction indicator wherein the indicating signals are acoustic as well as visible signals which are actuated by mechanical means.

With these and other objects in view the invention consists in the construction, combination and arrangement of parts as will be hereinafter more fully described, illustrated in the accompanying drawing, and pointed out in the claims hereunto appended.

In the accompanying drawing:

Figure 1 illustrates the application of a direction signal constructed according to the present invention, to a motor vehicle.

Fig. 2 is a top plan view of a mechanical switch.

Fig. 3 is a side view of the switch and signal operating means and signal casing partly in section, the section through the switch being taken on line 3—3 of Fig. 2.

Fig. 4 is a cross section through the signal casing the section being taken on line 4—4 of Fig. 3.

Referring to the drawing, an automobile 10 of the ordinary well known construction is provided in front of its seat 11 and steering wheel 12 with a switch board 13 and at its rear with a signal box or casing 14, the signals contained within the casing are adapted to be operated from the switch 13 through the intermediary of connections, the nature of which will be hereinafter more fully described.

The mechanical switch 13 consists of a casing 14 provided with a cover having two parallel longitudinal slots 15 and 16 through each of which the threaded shanks of a knob 17 extends which is screwed into a plate 18 provided with downwardly directed projections 19 and 20. The projection 20 rests upon the upper part of a wedge-shaped block or plate, while the projection 19 normally engages a recess in said plate 21.

The plate 21 has at its inner end an upstanding nose or button 22, and the underside of the block rests upon a spring 23 normally pressing the block upward with its recess in engagement with the projection 19 of the plate 18.

To the front edge of each plate 18 the end of a cable 23 is secured, which is guided over rollers 24 within a casing 25 leading to the signal box 14.

It will be understood that two sets of each of the parts are provided which are constructed alike so that the description of one set will be sufficient for the understanding of both.

The casing 14 is provided at its forward end with a shoulder 14′ over which the projection 19 and 20 slide when plate 18 is released by the depression of 22, and a stop 14″ on the front is limiting the forward movement of the plate 18.

The free ends of each of the cables are guided into the casing or box 14 and therein over lower rollers 26 and 27, and upper rollers 28 and 29 respectively and are secured to the lower ends of shoulders 30 and 31 of hands 32 and 33 secured upon bars 34 pivotally mounted within the casing.

The cables are normally taut and hold the hands 32 and 33 within the casing 14. When however, the switch 13 is operated to release the plate 18 from its engagement with the block 20 upon the operation of the button 22, springs 35 and 36 secured with one of their ends to pins 37 and 38 on the shoulders 30 and 31 respectively, and with their other ends to pins 39 and 40 mounted between the side walls of the casing, will swing the hands, which are now released by the slack in the cables, out of the casing through suitable openings in the opposite side walls thereof, as shown in Fig. 4.

The outward movement of the hands brings the square parts of the bars 34 in contact with the outer ends of levers 41, pivoted intermediate their ends as at 42 to a plate at the rear wall of the casing, said ends normally resting against the cut-away portions 43 of the bars 34.

Upon the operation of their outer ends by said outward swinging hands, the inner ends of the levers 41 engage a contact 44 to press the same into engagement with a contact plate 45 from which the contact is normally separated.

This contact plate carries at its front face binding posts for wires 46 and 47, the free ends of which are connected with the poles of a battery.

A lamp 48 and a bell 49 are located in a circuit with the battery and said contacts so that upon the closing of the circuit between contact 44 and plate 45 upon the outward movement of the hands the bell will be sounded and the lamp will glow. When it is desired to return the hands into their normal position the handle 17 is operated manually to operate the plate 18, the projection 19 of which will then again engage the recess of the block 21. During this time the cables 23 will be tautened and this will operate to draw the hands inside of the casing 14 and to interrupt the contact between 44 and 45 so that the bell will stop its ringing and the lamp will cease to glow.

From the foregoing description it will be clear that the driver of the vehicle when he intends to make a turn to the right or to the left need only press the right or left hand button 22 down in order to release the left or right hand which will be swung out of the respective side of the casing or box 14 at the rear of the casing thus giving the driver of a following vehicle notice of his intention to turn to the left or right at the same time sounding the signal and illuminating the lamp, the rays of which will be reflected upon the rear face of the hand which also may be provided with the inscription "Right" or "Left" as the case may be. When the turn is finished the operator will draw the knob 17 which has been drawn forward by the cable, upon its release from the block 21 under the action of the spring 35 swinging the hands outward, backward, and the cable becoming taut will swing the hands inward and the engagement of the projection 19 with the block 21 will lock the parts in their normal positions.

If the driver desires to stop the vehicle altogether he will simply operate both buttons 22 simultaneously thus releasing both hands to swing out laterally.

From the foregoing description taken in connection with the accompanying drawing the advantages of the construction and the method of operation will be readily apparent to those skilled in the art to which the invention relates and while I have described the principle of operation of the invention together with the device which I now consider to be the best embodiment thereof, I desire to have it understood that the device shown is merely illustrative and that such changes may be made when desired as are within the scope of the claims.

What I claim is—

1. In a signaling system for automobiles, a mechanical switch in front of the driver's seat, comprising a casing, a top plate on said casing having two parallel longitudinal slots, two recessed blocks within said casing, springs supporting said blocks at one end, buttons upon the upper ends of said blocks projecting above the top plate, sliding plates in said casing, a pair of lower projections for each plate adapted to engage with their projections the recesses of said block, and cables connecting said sliding plates with the signaling means of said system, said buttons adapted to be operated for disengaging said projections from the recesses in said block for slackening said cables.

2. In a signaling system for automobiles, a mechanical switch, comprising a casing in front of the driver's seat, a top plate for said casing provided with two parallel slots and two openings, a shoulder within said casing at the bottom thereof, said casing provided with two longitudinal grooves, sliding plates in said grooves, handles on said blocks projecting through the longitudinal slots of said casing, two bottom projections on each of said plates, recessed blocks underneath said plates, springs supporting the outer ends of said blocks, a push button on each of said blocks projecting through the openings of said top plate, the rear projections on said plate adapted to normally engage the recess of said blocks, taut cables secured to the front parts of said plates, a stop limiting the forward movement of said plates.

In testimony whereof I have affixed my signature.

GEORGE KOMLOSY.